US012485986B2

United States Patent
Morelli

(10) Patent No.: US 12,485,986 B2
(45) Date of Patent: Dec. 2, 2025

(54) TELESCOPIC SEATPOST

(71) Applicant: Angelo Morelli, Pontenure (IT)

(72) Inventor: Angelo Morelli, Pontenure (IT)

(73) Assignee: Angelo Morelli, Pontenure (IT)

( * ) Notice: Subject to any disclaimer, the term of this patent is extended or adjusted under 35 U.S.C. 154(b) by 911 days.

(21) Appl. No.: 17/708,106

(22) Filed: Mar. 30, 2022

(65) Prior Publication Data

US 2022/0315145 A1    Oct. 6, 2022

(30) Foreign Application Priority Data

Mar. 31, 2021    (IT) .................. 102021000007997

(51) Int. Cl.
*B62J 1/06* (2006.01)
*B62J 1/08* (2006.01)

(52) U.S. Cl.
CPC . *B62J 1/06* (2013.01); *B62J 1/08* (2013.01); *B62J 2001/085* (2013.01)

(58) Field of Classification Search
CPC .......... B62J 1/08; B62J 1/06; B62J 2001/085; B62K 2206/00
See application file for complete search history.

(56) References Cited

U.S. PATENT DOCUMENTS

| 10,053,173 | B1 | 8/2018 | Metz |
| 10,214,258 | B2 | 2/2019 | Schlanger |
| 10,689,049 | B2 | 6/2020 | Chiesa |

FOREIGN PATENT DOCUMENTS

| CH | 714204 A2 | 3/2019 |
| CN | 110126944 A | 8/2019 |
| CN | 112373611 A | 2/2021 |
| DE | 202019002079 U1 | 6/2019 |

*Primary Examiner* — Jason D Shanske
*Assistant Examiner* — Al-Birr Rahman Chowdhury
(74) *Attorney, Agent, or Firm* — Dickinson Wright PLLC; Andrew D. Dorisio

(57) ABSTRACT

A telescopic bicycle seatpost for allowing a modification, while moving, of the height of a saddle with respect to the frame of a bicycle including a pair of telescopically-coupled tubular elements defined by a male tubular element inserted into a seat tube of the bicycle frame, and by a female tubular element coaxial to said male tubular element, a seatpost lock or head arranged at one end of the female tubular element, the seat post adapted for enabling/disabling an axial sliding movement of the female tubular element with respect to the male tubular element arranged on the seatpost itself and cooperating with shape and force coupling with means for locking in place the female tubular element in order to define two or more height configurations of the saddle with respect to the seat tube of the frame.

10 Claims, 4 Drawing Sheets

TELESCOPIC SEATPOST

TECHNICAL FIELD

The present invention relates to a telescopic seatpost.

More specifically, the present invention relates to a telescopic seatpost to be used on bicycles to allow the rider to modify the height of the saddle with respect to the seat tube of the bicycle frame as a function of the specific pedaling needs, and in general of specific usage needs of the bicycle itself.

BACKGROUND

As is known, a seatpost is an element forming a bicycle, connected to the seat tube of the frame of the latter, having the function of supporting the saddle and allowing an adjustment of the height thereof as a function of the height of the rider and/or as a function of the pedaling mode.

The adjustment of the saddle height by means of the seatpost is typically performed when the bicycle is stationary by releasing the constraint between the seatpost and the bicycle frame, which allows changing the portion of the seatpost protruding from the frame so as to increase or decrease the saddle height with respect to the bicycle frame.

However, the position in height of the saddle with the above-described seatpost needs to be adjusted when the bicycle is stationary and therefore they do not allow adjusting the height when using the bicycle (while moving) and thus the rider's position as a function of the movement conditions of the bicycle itself; more specifically, seatposts of the conventional type do not allow adjusting the height of the saddle during pedaling by raising it when pedaling uphill and lowering it in the downhill stretches, i.e., they do not allow a variation in the rider's center of gravity while moving, something which instead is particularly felt, for example during sporting events (in the case of mountain bikes, for example) in which lowering the center of gravity when going downhill improves the stability in fast "single tracks" or when going downhill. "Telescopic" type seatposts which allow changing the height of the saddle by a predetermined value, while moving, have been developed to solve such problems, especially (but not exclusively) in the field of sporting events.

Seatposts of telescopic type from the prior art consist of telescopically-coupled tubes comprising a "female" tube adapted to be inserted into the seat tube of the bicycle frame and an actuator, on which the saddle is stabilized, sliding with respect to the "female" tube to lower or raise the saddle.

The actuation of the telescopic seatpost is achieved with a hydraulic-type command, and more specifically by means of an actuator defined by a piston operated through a lever located below the saddle or through a remote control located on the handlebar of the bicycle which activates the piston to which the saddle is connected by means of a connection cable.

However, these solutions have considerable drawbacks associated with the fact that the lever control located below the saddle is rather inconvenient for activation (especially when travelling) and the remote control located on the handlebar results in an increase in weights, in addition to problems associated with maintenance and costs. Like the hydraulic-activation type, another known solution of telescopic seatpost comprises wireless remote activation controls which comprise a transmission unit and a receiving unit (located on the handlebar and on the seatpost, respectively) for controlling the activation of the piston without the use of wires or cables.

However, also such a solution results in considerable drawbacks, especially associated with the costs and weights of such an embodiment, in addition to dimensions, cumbersome nature and complexity of the constructional solution, in addition to continuous and costly maintenance for which specialized assistance is often required (with subsequent increase in the related costs).

A further drawback characteristic of conventional telescopic seatposts is that they are characterized by a single extension mode of the "all in/all out" type, i.e., the piston is completely inserted or completely extracted with respect to the "female" tube (constrained to the seat tube of the bicycle frame), thus allowing the saddle to take only two positions as a function of the length of the travel of the piston itself, and this makes impracticable intermediate positions which are impossible to predict with the required accuracy while moving.

A further drawback is that conventional telescopic seatposts are characterized by considerable weights (about 500/600 grams and more), resulting in them not being suitable for all types of bicycles.

A further drawback of conventional telescopic seatposts is that they have a shape constraint, i.e., they need to have a cylindrical shape (for the seatpost tubes) considering the presence of the piston; however, the shape of such conventional telescopic seatposts is a limitation for the modern bicycle frames which, since they are more frequently made of ultralight materials such as carbon fiber, for example, may have frame elements (seat tubes) with the most disparate shapes and sizes dictated by aesthetical needs, in addition to structural ones.

A further disadvantage of conventional telescopic seatposts is that the hydraulic piston generally only works "at the tip" with a head mounted centrally on the piston axis (and with the saddle mounted centrally on the head and therefore, centrally with respect to the piston axis), and this is because such seatposts do not have sizes such as to make them structurally resistant to supporting strong lateral stresses (i.e., off-axis) transmitted by the saddle; to obviate such a drawback, such seatposts should be characterized by larger dimensions with respect to the actual ones, but this would result in an increased weight and subsequent increased cost or inconvenience of use.

A further drawback of conventional telescopic seatposts, which is a consequence of the above description, is that they are not capable of ensuring a perfect and constant locking of the saddle which is frequently subject to—especially due to the travel of the hydraulic piston (indeed, the greater the travel of the piston, the larger the arm of the lever which transmits damaging stresses to piston stability (rider weight, road conditions, holes, depressions, etc.)—vibrations and swaying (for example, lateral oscillations and pitching of the saddle which tend to cause a misalignment thereof)).

A further drawback of conventional telescopic seatposts, which is a direct consequence of the hydraulic piston only operating at the tip with the head and therefore with the saddle mounted centrally with respect to the piston axis, is that they do not allow to take into account the rider's anatomical features (rider's height, for example) which affect the quality of the rider's pedaling and performance; therefore, this is an ergonomic drawback which forces the rider to adapt to the seatpost in light of the fact that such a seatpost may not be adapted to the rider's anatomical features and specific pedaling needs.

A further and important drawback is the presence of pressurized components (the piston) which may be particularly dangerous for the rider in case of breaks or malfunctioning, but also for mechanics or operators working on the bicycle for repairs or replacements or the like (for example, in case of urgent interventions while moving during sporting events).

SUMMARY

It is the object of the present invention to obviate the drawbacks disclosed above.

More specifically, it is the object of the present invention to provide a telescopic seatpost adapted to be used on bicycles while moving.

It is a further object of the present invention to provide a telescopic seatpost which allows changing the travel positions of the saddle, thus also allowing accurate and programmable intermediate positions between an "all up" position and an "all down" one.

It is a further object of the present invention to provide a telescopic seatpost which has no constraints as for the shaping and materials of the tubular elements forming said seatpost.

It is a further object of the present invention to provide a telescopic seatpost which has minimum, in addition to easy and simple maintenance by non-specialized personnel, and for which the replacement of the individual forming elements is possible, when required, without the replacement of the entire seatpost assembly.

It is a further object of the invention to provide a telescopic seatpost which allows mounting a saddle in a more or less retracted position (offset) with respect to the central axis of the seatpost tubes according to the rider's specific needs in terms of the pedaling mode, and according to the physical/anatomical features of said rider.

It is a further object of the invention to provide a telescopic seatpost adapted to ensure a perfect and constant locking of the saddle under all conditions of use of the bicycle (associated with the rider's weight, road conditions, holes, depressions, etc.), and a stability and resistance to vibrations and swaying of the lateral oscillation and pitching type of the saddle which tend to cause a misalignment.

It is a further object of the present invention to provide a telescopic seatpost which simplifies the height adjustment of the saddle while moving, in addition to speeding it up.

It is a further object of the present invention to provide a telescopic seatpost which is lightweight and highly performing in terms of operation and ensuring increased performance for the rider using it (especially in case of sporting events).

It is a further object of the present invention to provide users with a telescopic seatpost adapted to ensure increased resistance and reliability over time and such as to be easily and affordably made as well.

These and other objects are achieved by the invention having the features outlined in claim 1.

According to the invention, there is provided a telescopic bicycle seatpost for allowing a modification of the height of a saddle with respect to the seat tube of the bicycle frame as a function of pedaling needs and as a function of the rider's physical features (height, weight, anatomical features, etc.), comprising a pair of telescopically-coupled tubular elements defined by a male tubular element inserted into a seat tube of the bicycle frame and by a female tubular element coaxial to said male tubular element, a seatpost lock or head arranged at one end of the female tubular element on the opposite side with respect to that of coupling to the male tubular element, said seatpost comprising mechanical means for enabling/disabling an axial sliding movement of the female tubular element with respect to the male tubular element cooperating with means for locking in place the female tubular element according to a selective and configurable adjustment of the height of the saddle with respect to the bicycle frame.

Advantageous embodiments of the invention appear from the dependent claims.

BRIEF DESCRIPTION OF THE DRAWINGS

The construction and functional features of the telescopic seatpost of the present invention may be better understood from the following detailed description in which reference is made to the accompanying drawings which show an embodiment thereof given only by way of explanation and not by way of limitation, and in which.

DETAILED DESCRIPTION

Figure 1:
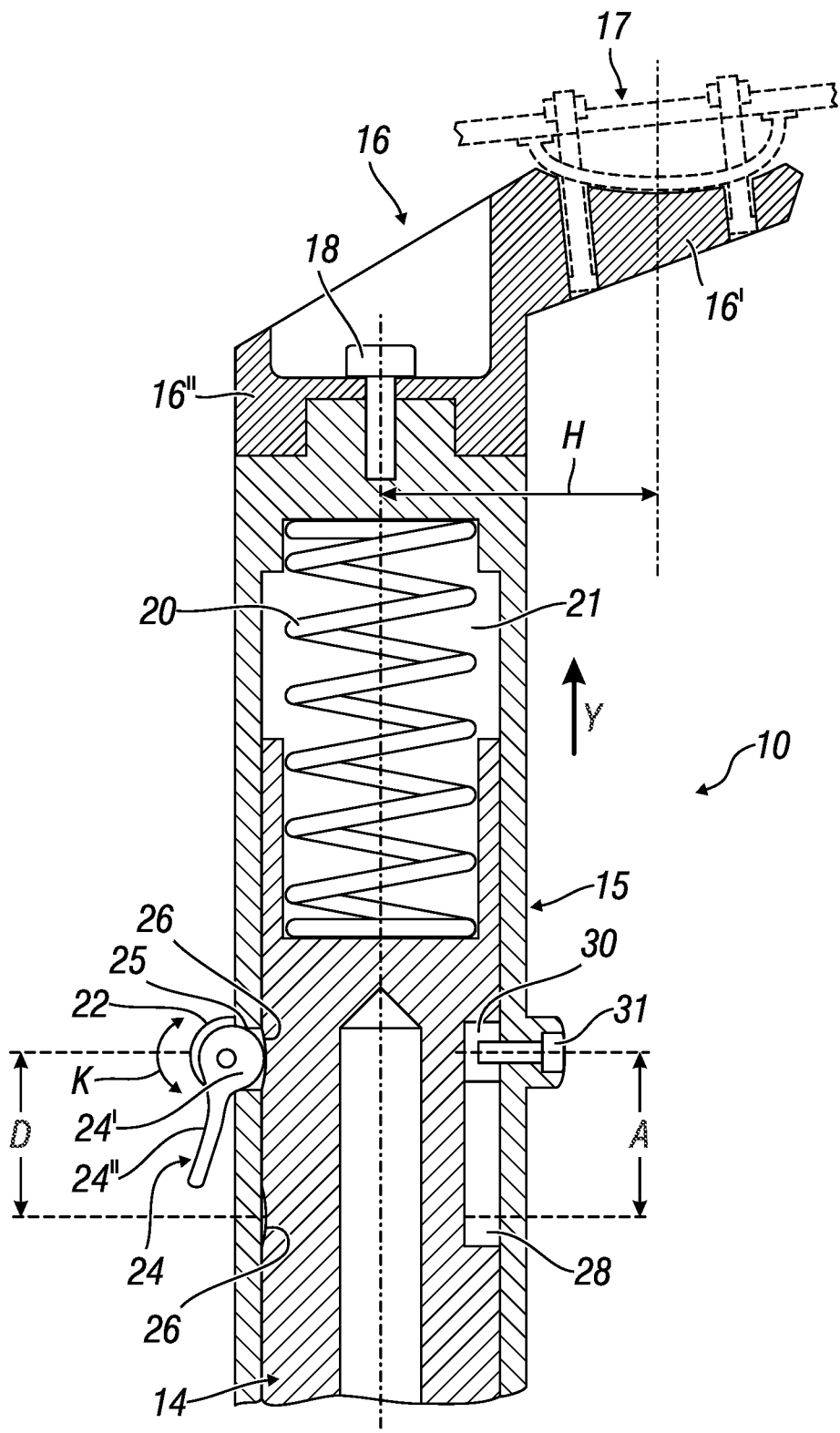
FIG. 1 diagrammatically shows a view of a telescopic seatpost of the present invention, partly sectioned according to a longitudinal plane and according to a first movement configuration.

With reference to the mentioned drawings, the telescopic seatpost of the present invention, indicated globally by 10, comprises a pair of telescopically-coupled tubular elements defined by a male tubular element 14 and a female tubular element 15, and a seatpost lock or head 16 coupled to the female tubular element 15 (saddle 17 is shown with a dashed line) on the side opposite to the coupling one to the male tubular element 14.

The male tubular element 14 is inserted into a seat tube of the bicycle frame (not shown in the drawings) and the female tubular element 15 is axially and externally coupled to said male tubular element and slides with respect thereto according to the modes and means better described below.

The lock or head 16 is rigidly constrained to the female tubular element 15 by means of screws 18 or equivalent retaining means or alternatively, said lock or head may be obtained in a single body integral with the female tubular element 15.

The lock or head 16 comprises a protrusion or tail 16' extending from a portion 16" of coupling to the female tubular element 15 and having the function of defining a means for constraining saddle 17 in an off-center or offset position by a distance "H" with respect to the main axis of the male and female tubular elements; the offset distance "H" is selected as a function of the rider's needs for ensuring ergonomics and performance (for example, if the rider is tall and requires greater saddle retraction for a highly performing pedaling at maximum physical performance of the rider) and may be changed by replacing the lock or head 16 or the female tubular element 15 if the lock or head 16 is integrated in the latter.

In the preferred embodiment in the drawings, the male 14 and female 15 tubular elements are of cylindrical type having a circular cross-section; however, such tubular elements may have shapes with different sections (suitable to be coupled to corresponding shapes of seat tubes of the bicycle frame) of the quadrangular, elliptical type, or other shapes as a function of the specific aesthetical and/or construction needs which do not limit the telescopic sliding of the two tubular elements.

Moreover, the two male 14 and female 15 tubular elements and lock or head 16 (either when it is a separate element and is separable from the female tubular element 15 or when it is integrated in a single body therewith) are made of carbon fiber, titanium, magnesium and other known and similar materials with increased mechanical properties and at the same time, very contained weights.

An elastic element 20 defined, for example by a helical spring or other type which is known and functional for the purpose, is arranged coaxially to the male tubular element 14 and the female tubular element 15 and inside a chamber 21 formed between said two male 14 and female 15 tubular elements (in particular, chamber 21 is defined between an upper end of the male tubular element 14 opposite to that of connection with respect to the seat tube of the bicycle frame and an inner front of an end of the female tubular element opposite to the connection end of the male tubular element with respect to the seat tube of the bicycle frame), with said chamber 21 with varying volume as a function of the telescopic movement of the female tubular element 15 with respect to the male tubular element 14. There are arranged, externally to the female tubular element 15 and more specifically, on the outer side surface thereof, means for enabling/disabling a sliding movement of the female tubular element 15 with respect to the male tubular element 14 (according to a direction indicated by arrow "Y" in the drawings) which, in the case of the preferred embodiment in the drawings, comprise a fork 22 adapted to form a hinge constraint for a lever 24 constrained to said fork 22 with a horizontal rotation axis.

Said lever 24 comprises an eccentric involute element 24' hinged with respect to the fork, and a protruding leg 24" which extends from the eccentric involute element and defines a handle for controlling a rotation of the eccentric involute element 24', as better described below. Lever 24 preferably is made of hard plastic material (PVC, for example) or another suitable material.

The female tubular element 15, at fork 22, comprises a through type opening 25 with which the eccentric involute element 24' of lever 24 engages.

The male tubular element 14 comprises, on the outer side surface, at least two pockets 26 aligned along a generatrix or vertical axis of the tubular element and arranged at a distance "D" with respect to each other; if there are more than two pockets 26, said pockets may be equally spaced from one another or may be positioned at different distances from one another (for example, considering three pockets, the intermediate pocket may be closer to the lower pocket and further from the upper pocket).

Several groups (two or more) of at least two pockets 26 as described above may be formed on the outer side surface of the male tubular element 14, in which the single groups are arranged along the peripheral extension of the lateral surface of the male tubular element 14, for example with an arrangement of 120°; for example, in the case of two groups of pockets 26, the distances "D" between the pockets of a first group are different from the distances between the pockets of a second group (for example, one group with the pockets spaced at 40 mm, one group with the pockets spaced at 30 mm, etc.) and furthermore, the number of pockets of one group may be different from the number of pockets of another group (for example, one group comprising two pockets, one group comprising three pockets, etc.).

The male tubular element 14 comprises a recess 28, formed along a generatrix or vertical axis of the male tubular element and defining a seat for a key 30 constrained to the female tubular element 15 (the key is constrained inside the female tubular element by means of a screw or grub 31 or with other retaining means suitable for the purpose) such as, as better detailed below, to slide in said recess having the function of always ensuring a correct alignment between the saddle and the longitudinal axis of the bicycle during the operations of varying the height of the saddle itself.

The size of longitudinal extension of recess 28 defines the amplitude of the maximum travel "A" of the axial sliding movement of the female tubular element 15 with respect to the male tubular element 14, i.e., defines the amplitude of the movement of the seatpost from "all down" to "all up" of the saddle.

The number of recesses 28 corresponds to the number of the above-described groups of at least two pockets 26.

In addition to being functional to the sliding of key 30, recess 28 allows ensuring a correct alignment of the saddle also if the seatpost were not completely and correctly locked in place (for example, in case of accident or incorrect locking maneuver and the like); this however allows the rider to use the bicycle without poor pedaling problems or the like and/or without the need for immediate assistance by specialized personnel and furthermore, without rider performance drawbacks (performance which is of fundamental importance in sporting events).

Figure 4:
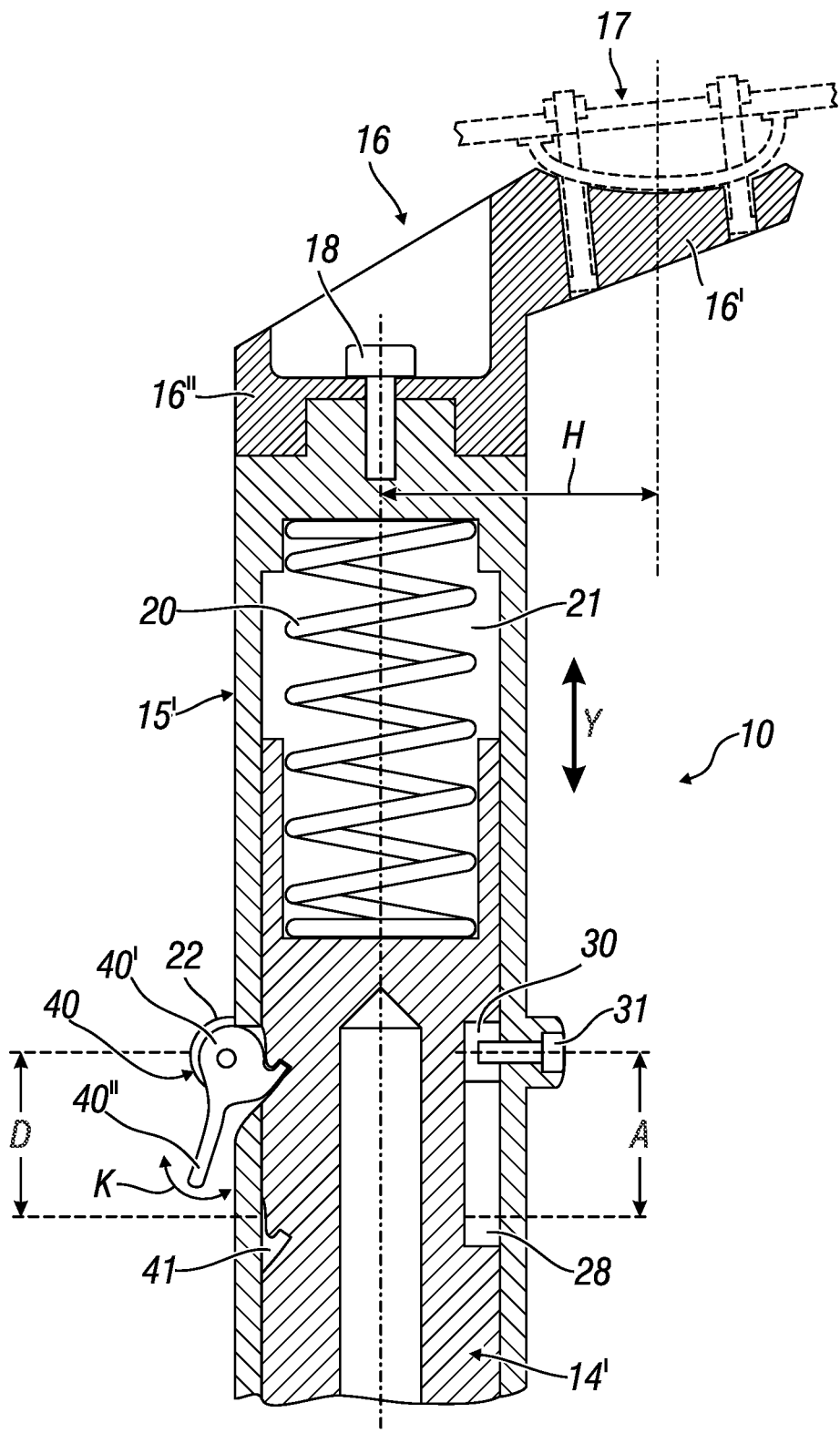
FIG. 4 diagrammatically shows a partly sectioned view according to a longitudinal plane, of a construction variant of the telescopic seatpost of the invention.

FIG. 4 shows a construction variant of the telescopic seatpost of the invention.

According to such a variant, fork 22 defines a hinge constraint for a lever 40 comprising an eccentric involute element 40' constrained to said fork and having horizontal rotation axis, a leg 40" which protrudes with respect to said eccentric involute element and a safety stop element of the catch or hook 40''' type which extends from said eccentric involute element and which is adapted to be engaged in a dedicated and corresponding seat formed in a pocket 41 of the male tubular element 14' (pocket 41 has the same functional features as pocket 26 described above and therefore, is not further described).

The operation of the telescopic seatpost of the invention described above with reference to the construction features, is detailed below.

FIG. 1 (and FIG. 4) show the telescopic seatpost of the invention in a first operating configuration ("all up" configuration) in which the bicycle saddle is locked at the maximum distance with respect to the seat tube of the frame, with the female tubular element 15 (or 15') raised with respect to the male tubular element 14 and with key 30 abutting with a front of upper end of recess 28.

In such a configuration, the eccentric involute element 24' of lever 24 is engaged in an upper pocket 26 of the male tubular element 14 and more specifically, the eccentric involute element 24' is in a contact position in which it applies a maximum contact pressure in pocket 26, thereby preventing any relative movement of the female tubular element 15 with respect to the male tubular element 14.

If there is a need to lower the saddle in order to lower the center of gravity (for example, when facing a downhill stretch), the rider acts on lever 24 (as indicated by arrow "K" in the drawings—releasing rotation), forcing a rotation of the eccentric involute element 24', which is disengaged from contact with pocket 26 (the upper pocket) of the male tubular element 14 and thereby enabling an axial sliding movement (telescopic movement) of the female tubular element 15 with respect to the male tubular element 14.

Once the desired position in height is reached (for example, the "all down" position in FIG. 2) at another pocket 26 (the lower pocket), the rider locks the seatpost in such a position by rotating lever 24 in direction opposite to the releasing rotation described above; such a rotation of lever 24 forces a rotation of the eccentric involute element 24' which applies an increasing pressure in said pocket 26 up to defining the locking in place of the female tubular element 15.

In the axial telescopic sliding movement of the female tubular element 15 with respect to the male tubular element 14, key 30 slides in recess 28 of the male tubular element, abutting with a front or lower end of said recess to define a stroke end position for the movement of the element.

Figure 2:
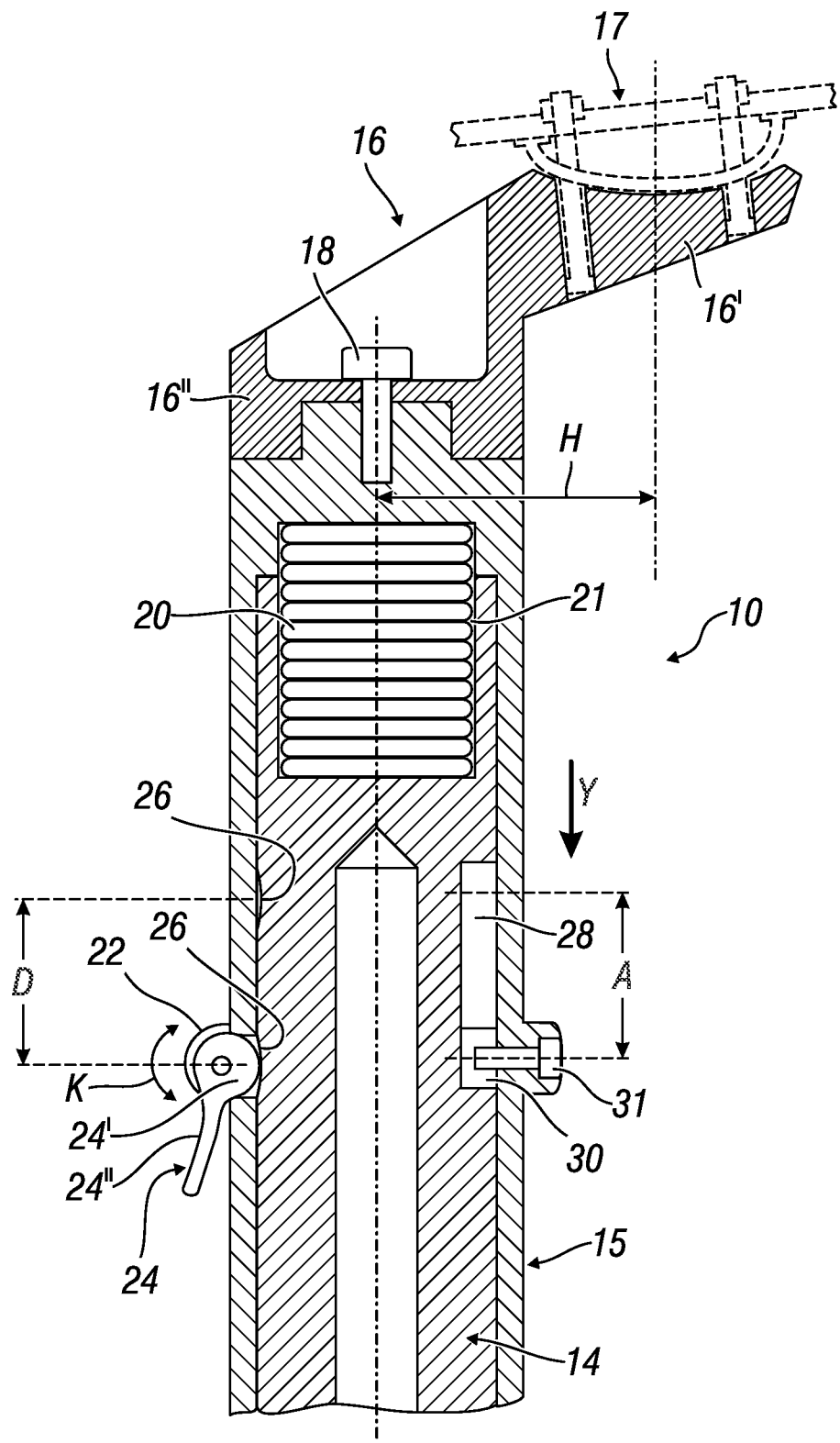
FIG. 2 diagrammatically shows a view of a telescopic seatpost according to FIG. 1, according to a second movement configuration.
Figure 3:
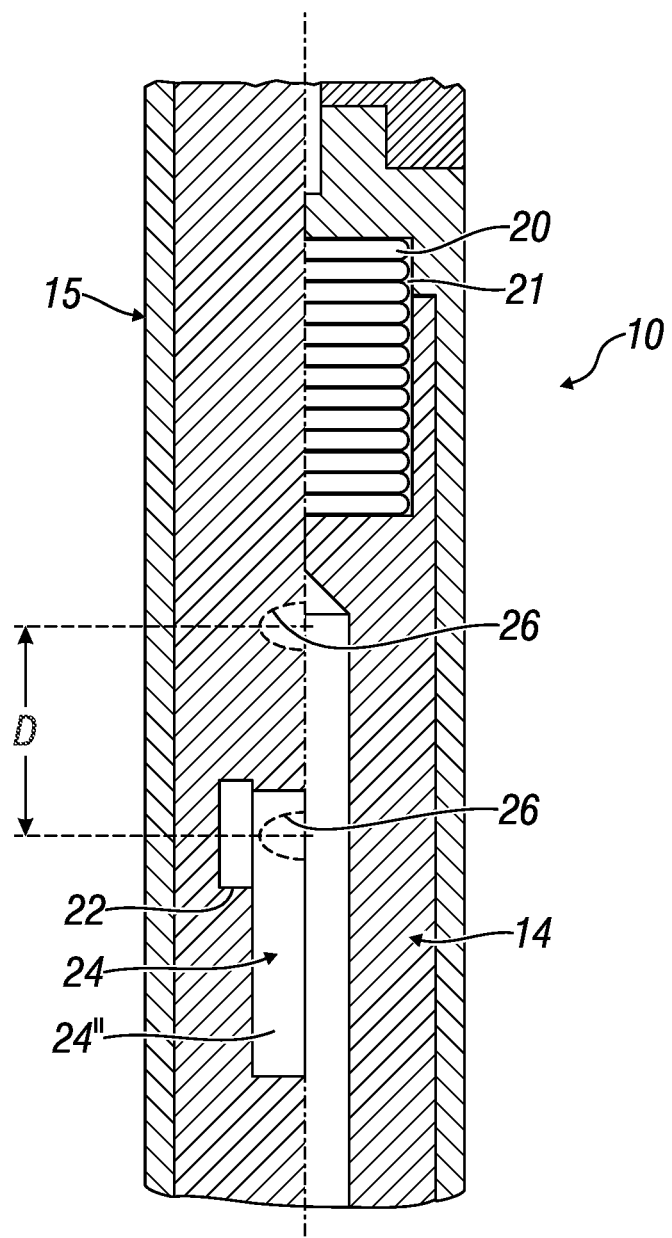
FIG. 3 diagrammatically shows a partly sectioned front view of the telescopic seatpost according to the preceding drawings.

Moreover, the elastic element 20 is compressed in the passage from the configuration in FIG. 1 ("all up" configuration) to the configuration in FIG. 2 ("all down" configuration), thus accumulating elastic energy which is returned in the passage from the "all down" configuration to the "all up" configuration for a quick and smooth return to said "all up" configuration; to switch from an "all down" configuration to an "all up" one, the rider is to rotate lever 24 into releasing position and the elastic element 20 will bring the saddle back into the "all up" configuration due to the effect of the elastic return.

If there are more than two pockets 26 (three or more), the rider can adjust the height of the saddle according to intermediate positions between the "all up" and "all down" configurations.

Moreover, the rider may select between various configurations of "all up" and "all down" by varying the type of groups of at least two pockets 26; in this case, it is necessary to rotate the male tubular element 14 to arrange said pockets 26 at lever 24 of the female tubular element 15 (this means that key 30 slides in the recess corresponding to the new group of pockets and is to be constrained with respect to the female tubular element).

The advantages achieved by the telescopic seatpost of the invention are apparent from the foregoing description.

The telescopic seatpost of the present invention allows an advantageous mechanical adjustment of the height of the saddle of a bicycle while moving.

It is further advantageous that the telescopic seatpost of the invention is adapted for use on all types of bicycles (road bicycles, mountain bikes, racing bicycles, etc.).

It is further advantageous that the telescopic seatpost of the invention is characterized by very contained weights, much lower than those of conventional telescopic seatposts and comparable to those of fixed seatposts.

It is further advantageous that the seatpost of the invention allows changing the travel positions of the saddle, thus also making possible accurate intermediate positions which are programmable between "all up" and "all down".

It is further advantageous that the provided locking/releasing lever of the eccentric involute element allows locking the seatpost with millimetric accuracy in programmed position; indeed, the rider immediately perceives when the female tubular element is at a pocket of the male tubular element, this is because the eccentric involute element may easily enter said pocket and define the locking, while said eccentric involute element does not allow any movement of the lever when the female tubular element is not at a pocket.

A further advantage of the seatpost is that it is simple and easy to use, in addition to being safe for the rider as well as a mechanic or technician working on such a bicycle. It is further advantageous that the telescopic seatpost is easy and simple to service and allows replacing single construction elements when required, without the need to replace the whole seatpost.

A further advantage of the seatpost of the invention is that, by virtue of the construction and operating features described in addition to the different usable materials, it does not have any constraints as for the shape of the male and female tubular elements of said seatpost, which may be easily adapted to any shape and form of the seat tube of the bicycle frame.

It is further advantageous that the telescopic seatpost of the invention allows mounting heads with the retraction of the fastening position of the saddle having different measurements irrespective of the amplitude of the travel of the seatpost, and this defines an increased flexibility thereof which makes it easily adapted to the physical features of the rider (height, build, weight), to the advantage of pedaling quality and rider comfort, in addition to performance.

It is further advantageous that, by virtue of the recess of the male tubular element in which the key slides, the telescopic seatpost of the invention also ensures a correct alignment of the saddle if the seatpost is not completely and correctly locked in place (for example, in case of accident or incorrect locking maneuver and the like); thereby, the rider may continue pedaling without any problems of any kind and without the need for immediate assistance or without the need to stop the movement of the bicycle to solve an incorrect locking in place of the seatpost.

It is further advantageous that the telescopic seatpost of the invention allows adjusting the position in height of the saddle with smooth movements of the female tubular element with respect to the male tubular element, thus preventing abrupt and unexpected (or "sudden") sliding movements which may be bothersome and/or dangerous and/or traumatic for the rider (knocks in the tailbone area or to the legs, etc.).

Although the invention was described above with particular reference to the embodiments thereof given only by way of non-limiting example, several modifications and variants will become apparent to those skilled in the art in light of the above description. Therefore, the present invention aims to encompass all modifications and variants falling within the scope of the following claims.

The invention claimed is:

1. A telescopic bicycle seatpost (10, 10') for allowing a modification, while moving, of the height of a saddle (17) with respect to a seat tube of the frame of a bicycle as a function of pedaling needs, comprising a pair of telescopically-coupled tubular elements defined by a male tubular element (14, 14') inserted into a seat tube of the bicycle frame, and by a female tubular element (15, 15') coaxial to said male tubular element, a seatpost lock or head (16) arranged at one end of the female tubular element (15, 15') on the opposite side with respect to that of coupling to the male tubular element (14, 14'), said seatpost characterized in that it comprises mechanical means for enabling/disabling an axial sliding movement of the female tubular element (15, 15') with respect to the male tubular element (14, 14') arranged on the seatpost itself and cooperating with shape and force coupling with means for locking in place the female tubular element (15, 15') in order to define two or more height configurations of the saddle with respect to the seat tube of the frame, said mechanical means for enabling/disabling an axial sliding movement comprising an eccentric involute element (24', 40') rotationally arranged with respect to the female tubular element (15, 15') and adapted to be engaged in pressure contact with one of at least two pockets (26, 41) formed and vertically mutually aligned along an outer side surface of the male tubular element (14, 14'), the distance "D" between an upper pocket and a lower pocket of said at least two pockets (26) corresponding to a maximum movement travel of the female tubular element (15) with respect to the male tubular element (14).

2. The telescopic seatpost according to claim 1, characterized in that the axial coupling between the female tubular element (15, 15') and the male tubular element (14, 14') comprises a recess (28) adapted for keeping the alignment between the saddle (17) and the longitudinal axis of the bicycle during the variation in height of said saddle (17) and to delimiting a maximum sliding travel of the female tubular element (15, 15'), said recess (28) vertically extending over a distance (A) along an outer side surface of the male tubular element (14, 14') and defining a seat for a key (30) constrained to the female tubular element (15, 15') and sliding in said recess (28) along with the sliding of the female tubular element (15, 15'), the distance (A) corresponding to the distance (D).

3. The telescopic seatpost according to claim 1, characterized in that two or more groups of at least two pockets (26, 41) are formed along the periphery of the outer side surface of the male tubular element (14, 14'), the number of pockets (26, 41) and the distances between said pockets of a single group being different from the number of pockets and the distances between the pockets of another group of at least two pockets formed on the male tubular element (14, 14'), a corresponding recess (28) being included for each single group of at least two pockets (26).

4. The telescopic seatpost according to claim 1, characterized in that the eccentric involute element (24', 41') is rotationally constrained with horizontal rotation axis with respect to a fork (22) defining a hinge constraint for a lever (24, 40) comprising said eccentric involute element (24', 40') and a protruding leg (24", 40") extending from the eccentric involute element to define a handle for controlling a rotation of the eccentric involute element (24', 40') itself.

5. The telescopic seatpost according to claim 4, characterized in that the lever (40) comprises a safety stop element (40''') of the catch or hook type which extends from said eccentric involute element and is adapted to be engaged in a dedicated and corresponding seat formed in a pocket (41) of the male tubular element (14').

6. The telescopic seatpost according to claim 1, characterized in that it comprises an elastic element (20) arranged coaxially to the male tubular element (14, 14') and the female tubular element (15, 15') and inside a chamber (21) formed between said two male (14, 14') and female (15, 15') tubular elements, said chamber (21) being defined between an upper end of the male tubular element (14, 14') opposite to that of connection with respect to the seat tube of the bicycle frame and an inner front of an end of the female tubular element (15, 15') opposite to the connection end of the male tubular element with respect to the seat tube of the bicycle frame.

7. The telescopic seatpost according to claim 1, characterized in that the lock or head (16) is rigidly constrained to the female tubular element (15, 15') by means of screws (18) or grubs.

8. The telescopic seatpost according to claim 1, characterized in that the lock or head (16) is obtained in a single body which is integral with the female tubular element (15, 15').

9. The telescopic seatpost according to claim 1, characterized in that the lock or head (16) comprises a protrusion or tail (16') extending from a portion (16") of coupling to the female tubular element (15) having the function of defining a means for constraining the saddle (17) in an off-center or offset position by a distance "H" with respect to the main axis of the male and female tubular elements.

10. A telescopic bicycle seatpost (10, 10') for allowing a modification, while moving, of the height of a saddle (17) with respect to a seat tube of the frame of a bicycle as a function of pedaling needs, comprising a pair of telescopically-coupled tubular elements defined by a male tubular element (14, 14') inserted into a seat tube of the bicycle frame, and by a female tubular element (15, 15') coaxial to said male tubular element, a seatpost lock or head (16) arranged at one end of the female tubular element (15, 15') on the opposite side with respect to that of coupling to the male tubular element (14, 14'), said seatpost characterized in that it comprises a lever for enabling/disabling an axial sliding movement of the female tubular element (15, 15') with respect to the male tubular element (14, 14') arranged on the seatpost itself and cooperating with shape and force coupling with means for locking in place the female tubular element (15, 15') in order to define two or more height configurations of the saddle with respect to the seat tube of the frame, said lever rotationally arranged with respect to the female tubular element (15, 15') and adapted to be engaged in pressure contact with one of at least two pockets (26, 41) formed and vertically mutually aligned along an outer side surface of the male tubular element (14, 14'), the distance "D" between an upper pocket and a lower pocket of said at least two pockets (26) corresponding to a maximum movement travel of the female tubular element (15) with respect to the male tubular element (14).

* * * * *